US006761229B2

(12) United States Patent
Cripe et al.

(10) Patent No.: US 6,761,229 B2
(45) Date of Patent: Jul. 13, 2004

(54) IMPACT TOOL CONTROL APPARATUS AND IMPACT TOOL USING THE SAME

(75) Inventors: David W. Cripe, Camp Point, IL (US); Christopher Jones, Hamilton, IL (US)

(73) Assignee: Magna-Lastic Devices, Inc., Carthage, IL (US)

( * ) Notice: Subject to any disclaimer, the term of this patent is extended or adjusted under 35 U.S.C. 154(b) by 0 days.

(21) Appl. No.: 10/211,529

(22) Filed: Aug. 5, 2002

(65) Prior Publication Data

US 2002/0189830 A1 Dec. 19, 2002

Related U.S. Application Data

(62) Division of application No. 09/736,290, filed on Dec. 15, 2000, now Pat. No. 6,655,471

(60) Provisional application No. 60/171,117, filed on Dec. 16, 1999.

(51) Int. Cl.[7] .............................. B23Q 5/00; B23Q 1/00

(52) U.S. Cl. .............................. 173/176; 173/1; 173/2; 173/93; 173/93.5; 173/181; 173/183

(58) Field of Search ......................... 173/1, 2, 93, 93.5, 173/176, 181, 183

(56) References Cited

U.S. PATENT DOCUMENTS

| | | | | |
|---|---|---|---|---|
| 4,142,266 | A | 3/1979 | Dahl | 10/27 R |
| 4,347,571 | A | 8/1982 | Leung et al. | 364/431.08 |
| 4,418,669 | A | 12/1983 | Johnson et al. | 123/436 |
| 4,562,722 | A | 1/1986 | Schuele et al. | 73/11 |
| 5,181,575 | A | 1/1993 | Maruyama et al. | 173/180 |
| 5,285,857 | A | 2/1994 | Shimada | 173/1 |
| 5,289,886 | A | 3/1994 | Shikata et al. | 173/181 |
| 5,315,501 | A | 5/1994 | Whitehouse | 364/152 |
| 5,366,026 | A | 11/1994 | Maruyama et al. | 173/180 |
| 5,492,185 | A | 2/1996 | Schoeps et al. | 173/177 |
| 5,715,894 | A | 2/1998 | Maruyama et al. | 173/180 |
| 5,937,370 | A | 8/1999 | Lysaght | 702/138 |
| 6,134,973 | A | 10/2000 | Schoeps | 73/862.23 |
| 6,311,786 | B1 | 11/2001 | Giardino et al. | 173/1 |
| 2001/0032726 | A1 | 10/2001 | Cripe et al. | 173/1 |
| 2002/0020538 | A1 | 2/2002 | Giardino | 173/176 |

FOREIGN PATENT DOCUMENTS

| | | |
|---|---|---|
| WO | WO 01/47669 A1 | 7/2001 |

*Primary Examiner*—Rinaldi I. Rada
*Assistant Examiner*—Brian D Nash
(74) *Attorney, Agent, or Firm*—Blank Rome LLP

(57) ABSTRACT

An impact tool control method and apparatus and an impact tool using the same. Pulses of torque applied to a fastener by the impact tool are measured. The duration and magnitude of the torque pulse are subtracted from a torque signal and the resulting difference is integrated over time to obtain a fastener angular velocity signal. The angular velocity signal is integrated over time to obtain a displacement signal which can be converted to a torque signal. The impact tool can be controlled based on the value of the torque signal.

14 Claims, 1 Drawing Sheet

IMPACT TOOL CONTROL APPARATUS AND IMPACT TOOL USING THE SAME

CROSS-REFERENCE TO RELATED APPLICATIONS

This application is a Division of application Ser. No. 09/736,290 filed on Dec. 15, 2000 now U.S. Pat. No. 6,655,471.

This application claims priority of provisional application Serial No. 60/171,117 filed Dec. 16, 1999.

BACKGROUND OF THE INVENTION

1. Field of the Invention

The invention relates to control of the torque of a fastener tightened by an impact tool. More specifically, the invention is a method and apparatus which utilizes assumptions of fastener rotational inertia and joint rate to allow accurate control of the break-away torque or bolt tension of a fastener tightened by an impact tool without the need for accurate knowledge of fastener specifics.

2. Description of the Related Art

Impact tools, also known as impulse tools, are commonly used in the assembly of large fasteners, such as automotive wheel lug nuts, as they are able to deliver large amounts of torque yet are physically compact. Such tools operate by applying impacts or pulses of torque, i.e. torque high enough in amplitude to overcome the static friction of the fastener, and thus turn the fastener, yet short enough in duration such that the average torque felt by the operator is such that the tool is able to be operated manually. Because there is little correlation between the torque within the fastener applied by the tool and the torque felt by the operator, impact tools have not been used where accurate control of the fastener torque is important. Rather, controlled-torque assembly processes have been performed manually by an operator with a torque wrench, or in an automated system with a torque-monitored, (non-impact) motor-driven tool. However, these tools are not practical for assembly of large, high-torque fasteners, such as automotive wheel lug nuts.

If an impact tool is equipped with a torquemeter on the tool output shaft and the tool is used to tighten a fastener, the torquemeter will observe the torque pulses being delivered to the fastener. Each pulse will have roughly the same pulse width and torque amplitude. Taken individually, these pulses do not provide information as to the torque within the fastener. In other words, the non linear nature of the tightening process using impact tools makes it difficult to determine the instantaneous torque within a fastener. Accordingly, torque control of impact tools has had limited success.

SUMMARY OF THE INVENTION

It is an object of the invention to facilitate torque control of an impact tool.

It is another object of the invention to apply measurement of torque within the output shaft of an impact wrench to a system controlling the break-away torque within the fastener being tightened.

It is another object of the invention to control the torque of an impact tool accurately independent of the fastener being tightened.

To achieve these and other objects, a first aspect of the invention is a method for determining fastener torque comprising the steps of applying torque pulses to a fastener, measuring the amplitude and duration of each torque pulse, and processing the values of amplitude and duration of the pulses to obtain the torque on a fastener.

A second aspect of the invention is an impact tool comprising a body, an output shaft adapted to be coupled to a fastener, means for applying torque pulses to the output shaft, a torque transducer coupled to the output shaft, and means for processing the output of the torque transducer to obtain torque on the fastener.

A third aspect of the invention is a controller for an impact tool comprising a substraction circuit having an output, a first input and a second input, the first input being configured to accept a value representing calculated torque on a fastener being tightened by the impact tool and the second input being configured to accept a value of torque impulse being applied to the fastener, a velocity circuit having an output and an input coupled to the output of said substraction circuit and configured to integrate the value of the output of the substraction circuit over time to obtain a value indicating angular velocity of the fastener, a torque circuit having an output and an input coupled to the output of the velocity circuit and configured to integrate the value of the output of the velocity circuit over time to obtain the value indicating calculated torque on the fastener, the output of the torque circuit being coupled to the first input of the substraction circuit, and a threshold comparing circuit having an input coupled to the output of the torque circuit and being configured to generate a control signal for controlling the impact tool when a predetermined relationship between the value of the output of the torque circuit and a threshold value exists.

A fourth aspect of the invention is a retrofit system for an impact tool of the type comprising a body and an output shaft adapted to be coupled to a fastener. The retrofit system comprises a shaft extension having a first end and a second end, the first end being adapted to be coupled to the output shaft and the second end being adapted to be coupled to the fastener, a torque transducer coupled to the shaft extension, and means for processing the output of the torque transducer to obtain torque on the fastener.

BRIEF DESCRIPTION OF THE DRAWING

The invention is described through a preferred embodiment and the attached drawings in which.

DETAILED DESCRIPTION

Figure 1:
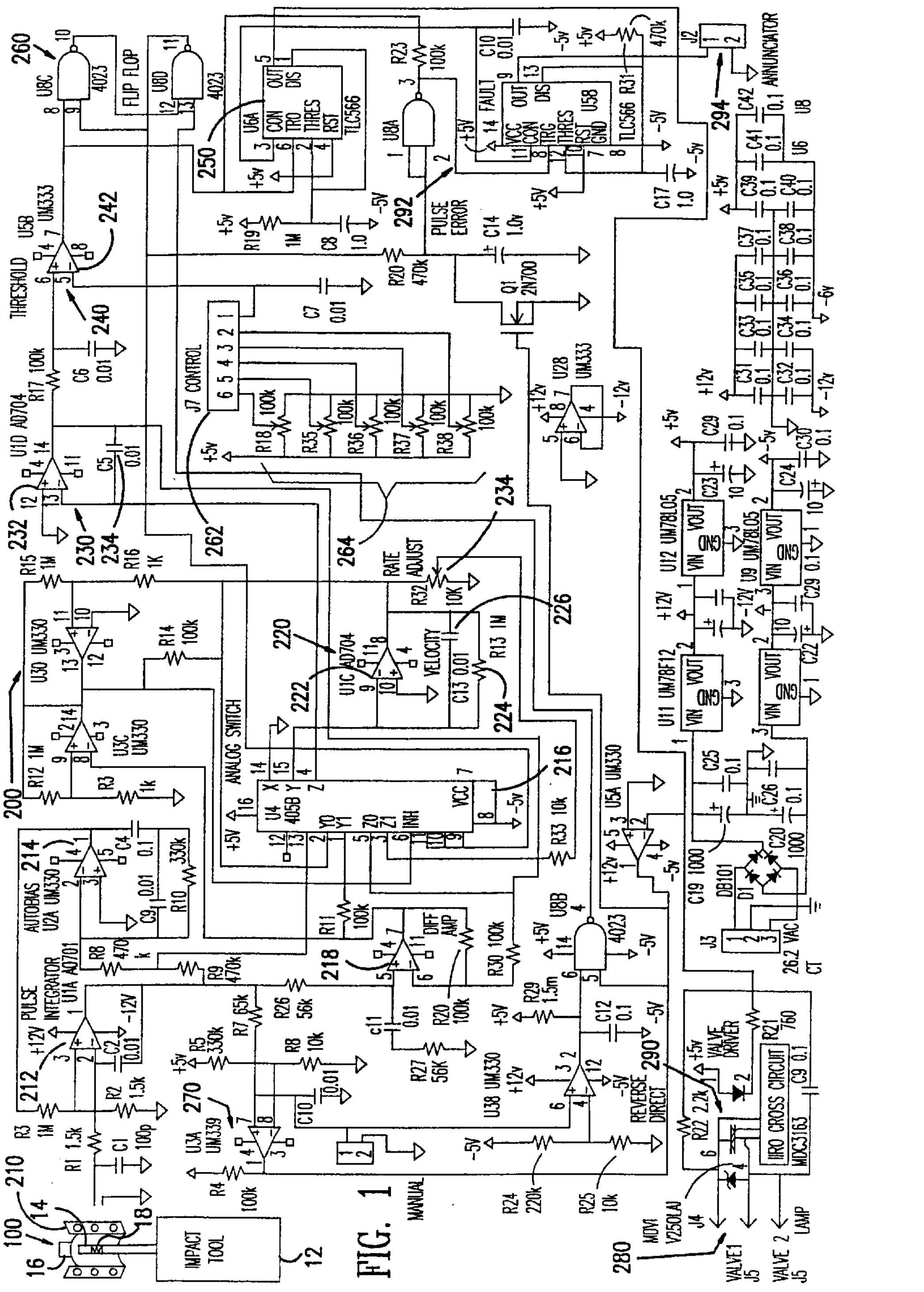
FIG. 1 is a schematic illustration of an impact tool and control system of the preferred embodiment.

Applicant has found that the torque pulses of an impact tool can be processed to provide information which can be used to infer the torque within the fastener being tightened. The phrase "impact tool" as used herein refers to any tool capable of imparting torque to any of fastener using torque pulses as defined above. Because the torque of a fastener is determined, in part, by the bolt tension of the fastener, the bolt tension can also be inferred from this information.

Typically, an air impact tool contains a compressed-air powered rotary motor. This motor spins a massive, flywheel-like driver, which at a given rotational velocity, is mechanically connected via a clutch mechanism, to an output shaft of the tool. This mechanical connection is made abruptly, creating a torque pulse or impact effect. At the time of the pulse, the rotational kinetic energy of the driver is transferred though the shaft to the to the socket and fastener to be turned. Because of the action of the driver clutch mechanism, the amount of kinetic energy delivered by the driver is very nearly constant from pulse to pulse. The kinetic energy of the rotation of the driver begins to be converted into potential energy as the driver elastically twists the shaft, placing torque at the output of the tool.

If the torque within the shaft exceeds the static frictional torque of the fastener to be turned, the fastener can then be turned by the torque within the shaft. The potential energy of the twisted shaft is translated into kinetic energy within the rotating fastener, and performs work by turning the fastener against the torque of the fastener. As the fastener is tightened by successive pulses, the static frictional torque of the fastener will approach the maximum torque available from the tool, and most of the kinetic energy of the driver will go into potential energy of twisting the shaft/socket system before the fastener will begin to turn. Consequently, less of the kinetic energy of the driver pulse will be applied to the fastener as the tool will instead experience an elastic rebound from the shaft/socket system. In these circumstances, the torque signal observed by the torquemeter on a shaft of the tool will approach that of a pulse with an amplitude that varies little on a pulse-to-pulse basis.

It has been experimentally verified that for a pulse wrench of the type previously described, if periodic and regular pulses of equal energy are applied to an initially untightened fastener, the break-away torque of the fastener increases in a time-dependent function resembling the square-root of an exponential curve. This can be understood in that because the impact tool applies a constant amount of energy with each pulse, and the fastener can accept successively smaller amounts of energy with each pulse, the amount of work done on the fastener is a piecewise-linear exponential function. The break-away torque of the fastener, which is related to the tensile force of the bolt is related to the square-root of the amount of potential energy within the stressed fastener. If the parameters determining the shape of this curve can be understood, a controller can be devised such that the operation of the impact wrench can be terminated at a point corresponding to a desired break-away torque of the fastener. The upper asymptotic limit of the break-away-torque-per time function will equal the peak-amplitude of the applied torque pulses of the impact wrench. The time constant of the function will be determined by the width of the torque pulses, and by the moment of inertia and joint rate of the fastener.

As noted above, the pulse-to-pulse measured torque within the shaft has little relationship to the instantaneous torque within the fastener and thus information regarding the torque within the fastener cannot be accurately derived from the characteristics of an isolated torque pulse. Instead, applicant has found that an accurate estimate of fastener torque can be made by determing the total of the product of torque amplitude and width for all pulses applied to the system.

Applicant has determined that the following equation accurately predicts the torque within a fastener tightened by an impact tool:

$$T_n=T_{ave}\cdot[1-exp(-(T_{max}\cdot\Delta t)_n\cdot k_1\cdot\Omega\div I_{nut})^{½})] \quad [1]$$

where:

$T_n$=calculated torque in the fastener after impulse number 'n', $T_{ave}$=average maximum torque measured within the shaft $(T_{max}\cdot\Delta t)_n$=sum total of the product of torque pulse amplitude and pulse width for each applied impulse up to impulse 'n', giving the total area under all impulses, $\Omega$=joint rate of fastener, the change in torque per change in fastener angle, $I_{nut}$=the rotational inertia of the socket/fastener system, and $k_1$=a constant that can be determined experimentally.

To precisely control the operation of an impact tool based solely upon information provided by a torque sensor mounted on an output shaft of an impact tool, it is necessary to know the rotational inertia and joint rate of the fastener. These are quantities often unknown to the operator who wishes only to control the tightening of an arbitrary fastener to a given torque. However, if the controller is operated to control the torque applied to a fastener in excess of 0.5 $T_{max}$, the sensitivity of equation [1] to error in joint rate or rotational inertia of the fastener is such that a +100% to −50% error in either of these quantities results in only an approximate +30% to −10% error in the calculated torque $T_n$. Consequently, if a reasonable approximation of joint rate and rotational inertia of the fastener can be made, the algorithm of equation [1] can operate to an acceptable degree of accuracy. It can be assumed that joint rate and rotational inertia of a fastener will be a function of the diameter of the fastener. The rotational inertia of a body is proportional to mass and diameter squared; mass being proportional to diameter cubed. Therefore, rotational inertia of a fastener is proportional to diameter to the fifth power.

The joint rate of a fastener is related to the bolt tension of the fastener by the fastener thread pitch. The bolt tension, as a function of fastener angle, is related to fastener diameter squared and thread pitch. Since the thread pitch of standard fasteners is inversely proportional to fastener diameter, the joint rate of a fastener is proportional to the diameter of the fastener to the fourth power. Thus, the ratio Of $\Omega$ to $I_{nut}$ in equation [1] is inversely proportional to fastener diameter. Therefore equation [1] may be written as:

$$T_n=T_{ave}\cdot[1-exp(-(T_{max}\cdot\Delta t)_n\cdot k_{2+}d)^{1/2})] \quad [2]$$

where d=diameter of fastener, and $k_2$=a constant that can be determined experimentally.

A controller can be used to control an impact tool using this algorithm in operation the operator may enter into the controller the desired torque of the fastener to be tightened. For a fastener of a given SAE (Society of Automotive Engineers) class, the rated torque is proportional to the diameter of the fastener to the third power. Using the algorithm, the controller, knowing only the desired torque of the fastener to be tightened, can infer the diameter of the fastener as being proportional to the cube root of the desired torque. Equation [2] may then be re written as:

$$T_n=T_{ave}\cdot[1-exp(-(T_{max}\cdot\Delta t)_n\cdot k_{3+}T_0^{1/3})^{1/2}] \quad [3]$$

where:

$T_0$=the desired torque of the fastener, and $k_3$=a constant that can be determined experimentally.

This control algorithm may be applied to fasteners of different SAE classes. There is only a 2:1 difference in the rated torque between fasteners of SAE 3 and SAE 8 rating. If the algorithm is set up for the median value of torque for these fasteners, for any SAE class fastener, the maximum error in assumed fastener diameter will be the cube root of 1.414, or +/−12%. An error of +/−12% in assumed fastener diameter will result in roughly a +/−3% error in calculated torque in equation [3]. Thus, the algorithm is robust and forgiving of, i.e. relatively independent of, variation in fastener type.

Equation [3] is relatively complex and thus real-time control of an impact tool controlled will require substantial signal processing capability. The algorithm maybe modified as follows:

$$T_n = V_n^{1/2} \cdot k_4 + T_0^{1/6}, \quad [4]$$

and $$V_n = V_{n-1} + (T_{tool} - V_{n-1}) \cdot \Delta t \quad [5]$$

where:

$V_{n-1}$=calculated work performed upon the fastener at impulse 'n−1'

$(T_{tool}-V_{n-1})\cdot\Delta t$=the area under the measured torque signal for impulse 'n' which exceeds $V_{n-1}$; and $k_4$=a constant that can be determined experimentally.

For this algorithm, the only real-time computations are summing the torque measured information which exceeds the calculated value of $V_{n-1}$. When this value of $V_n$ exceeds a pre-calculated threshold, the controller will terminate the operation of the tool. This threshold is given by the following equation:

$$V_0 = T_0^{7/3} \cdot K_4^{-2} \quad [6]$$

where $V_0$ is the value of $V_n$ where the operation of the tool shall be terminated where it is assumed that the torque within the fastener has reached $T_0$.

The rate at which the fastener is tightened by a given impact tool is determined largely by the diameter of the fastener. However, only a single variable is manually entered to control the tool, that being the desired torque of the fastener, the algorithm still provides for control of the applied torque of the fastener.

It should be noted that the purpose of tightening a fastener to a specific torque is that the bolt tension thus created will result in sufficient static friction within the fastener to prevent its loosening due to vibration, etc. The static friction will depend upon the degree, if any, that the fastener interface is lubricated. Addition of a lubricant to the fastener interface reduces the torque rating of a fastener, because the reduced coefficient of friction will result in a higher bolt tension for a given fastener torque. It is possible, given the torque rating of a fastener, to make assumptions regarding its diameter, and ultimately, its moment of inertia and joint rate. The joint rate is a complex quantity determined factors such as the tensile spring constant of the bolt, the coefficient of friction in the fastener, and the compression spring constant of the objects being joined. In using the algorithm for the control of the fastener tightening process in the preferred embodiment, nominal conditions can be assumed regarding the state of lubrication of the fastener. However, the algorithm can be adjusted to account for lubrication and other variables. For example, the operator could input variables such as the fastener diameter, the thread pitch, the SAE class, the fastener material, the joint rate, whether a shaft extension is used, joint rate factors, or other variables. All of these variables can be incorporated into the algorithm for controlling the impact tool.

According to SAE specifications, if, for example, a ½" fastener is lubricated with SAE 40 oil, its rated torque will be diminished by 31%. This is because the effective joint rate of the fastener has been reduced proportionately due to its diminished coefficient of friction. If an operator with a manual torque wrench were to hand-tighten the lubricated fastener in the above instance according to the non-lubricated specifications, the final bolt torque would be 31% over the desired value. If the algorithm is programmed for operation with an un-lubricated fastener, and operated as above, with a joint rate diminished by 31% due to lubrication of the fastener, the controller will operate the tool until a final torque will be attained which is 15% less than desired assuming the non-lubricated case. However, the bolt tension will be 15% higher than that desired assuming the un-lubricated case. Thus, the resulting error in bolt tension of the preferred embodiment is half that occurring with a manual tightening operation. As noted above, a second manual input to the tool controller specifying the state of lubrication of the fastener can be included to modify the appropriate constant in the algorithm to compensate for the lubricated versus unlubricated joint rate of the fastener.

FIG. 1 illustrates impact tool 100 and control system 200 in accordance with a preferred embodiment of the invention. Control system 200 can be embodied in any hardware and/or software for performing the functions described below. For example, control system 200 can be embodied in a microprocessor based digital controller (such as a field programmable gate array) programmed in a desired manner or in analog electrical components hardwired to accomplish the disclosed functions. Impact tool 100 (illustrated schematically) includes body 12 and torque transducer 18 on shaft 14 which is adapted to be coupled to fastener 16 (also illustrated schematically). In the preferred embodiment, torque transducer 18 is a magnetoelastic torque transducer, which produces a magnetic field proximate output shaft 19 in relation to the amount of torque applied. For example the magnetoelastic torque transducers, such as are disclosed in PCT international publication Nos. WO 99/21150 and WO 99/99/2115 can be used in the preferred embodiment. Shaft 14 can be the output shaft of the impact tool or a shaft extension suitable for retrofiting conventional impact tools with the control system of the invention.

Because of the pulsed nature of the torque pulse signal, it is possible to detect the magnetic field generated by the impact tool output shaft by detector 210 which can be a coil of wire circumferentially arrayed around transducer 18 or any other device for detecting a magnetic field. Detector 210 (illustrated in cross-section) will have an induced voltage proportional to the rate-of-change of the torque impressed upon shaft 14. To create a signal representing the torque pulse, the voltage signal in detector 210 is integrated by pulse integrator 212 of controller 200, an op-amp circuit in the preferred embodiment.

Any offset in the input voltage of pulse integrator 212, however small, will result in a ramping of the output signal of pulse integrator 212 until the output reaches the positive or negative voltage supply rail. Therefore, it is desirable to provide an offset correction mechanism in the form of autobias circuit 214 in which a sample of the output of pulse integrator 212 is itself integrated and then subtracted from the input of the pulse integrator 212 to correct for any offsets in pulse integrator 212. Autobias circuit 214 is muted by analog switch 216 during impulses to minimize pulse distortion.

A signal corresponding to the calculated torque of fastener 16 is subtracted from the torque impulse signal, i.e. the output of pulse integrator 212 by differential amplifier 218. To account for the effects of the static friction of fastener 16, it is assumed that fastener 16 will not begin to turn until the torque impulse signal exceeds the amplitude of the fastener torque (static friction). This point is determined by a zero-crossing detector observing the output of differential amplifier 218.

Specifically, when the output of differential amplifier 218, i.e. a difference signal, exceeds zero, a contact of switch 216 is closed, thus allowing the output signal of differential amplifier 218 to be integrated by velocity circuit 220 to create a signal proportional to the angular velocity of the fastener. In the preferred embodiment, velocity circuit 220 includes op-amp integrator 222 resistor 224, and capacitor 226. The action of viscous friction is simulated as resistor 224 in parallel with capacitor 226 of velocity circuit 220. The proper value of resistor 224 can be determined iteratively.

After the output of differential amplifier 218 falls below zero, the velocity of fastener 16 is decelerated until the velocity reaches zero. At this point the static friction of fastener 16 holds fastener 16 in place. This mechanism is reproduced by a comparator observing the signal of velocity circuit signal 220, which, as long as the velocity of fastener 16 is positive, holds closed the aforementioned contact of switch 216 allowing integration of the output differential amplifier 218.

The angular displacement of the fastener 16, which in turn is proportional to its torque, is the integral of the velocity of fastener 16. This function is performed by torque circuit 230 including op-amp integrator 232. A contact of analog switch 216, is provided at the input of integrator 232 so that the drift of integrator 232 between pulses will be minimized. The output of torque circuit 230 is the determined torque on fastener 126 and is used as the differential input to the differential amplifier 218 as described above.

The output of torque circuit 230 is compared to a preset voltage level threshold voltage comparator 240. This preset voltage determines the torque of fastener 16 at which the operation of tool 12 is terminated. The value of the preset voltage is determined in an adjustable manner by control unit 262 and variable resistance circuit 264. As the signal of torque circuit 230 is incremented with each successive torque impulse delivered by tool 12. When the preset voltage is exceeded by the output of torque circuit 230, comparator 242 activates timer circuit 250 which closes the air valve of tool 100 for a predetermined period, one to ten seconds for example, with a control signal. This terminates the action of tool 100, preventing further tightening of fastener 16 and provides enough time for the operator to release the tool actuator. The output of comparator 242 also changes the state of the flip-flop circuit 260, which activates contacts of switch 216 shorting out the capacitors of velocity circuit 220 and torque circuit 230.

Flip-flop circuit 260 holds these contacts closed, preventing drift of integrators 222 and 232 before the next tightening sequence is initiated. When a torque impulse is detected by pulse detect comparator 270, the state of flip-flop 260 is changed, releasing open the integrator shorting switches, allowing the algorithm computations to begin again. Tool 100 is controlled by solenoid-operated pneumatic valve 280 in-line with tool 100. Solid-state switch 290 is provided to control valve 280. It is anticipated that a likely user misapplication would be either the premature release of a trigger of tool 100, or removal of tool 100 from fastener 16 prior to the point at which fastener 16 has been tightened to a desired torque. To alert the operator of this occurrence, diagnostic circuit 292 is provided, which looks for an uninterrupted string of pulses from tool 100. If a period of time exceeding approximately 400 ms between pulses is detected by diagnostic circuit 292, valve 280 is closed for a predetermined period, and annunciator 294 sounds a warning tone.

The rate at which the torque increases within fastener 16 as a function of the angle though which it is turned is referred to as the "joint rate". To optimize the accuracy of the algorithm, the effective joint rate is set through the adjustment of the gain of torque circuit 230, through variable resistor 234. The majority of lug nuts used on automobiles lie within a narrow range of diameter and thread pitch. Therefore, it is possible to select a single nominal joint rate, as selected on variable resistor 234, and achieve acceptable accuracy in the tightening of the lug nuts on the majority of vehicles. However, the resistance value, or proposed parameters can be adjusted for various joint rates.

To initiate a fastener tightening sequence, a reset switch can be provided which provides two functions. When the reset switch is closed, it places a short across the capacitor 234, forcing the output voltage of torque circuit 230 to be zero. It also resets the tool control flip-flop so that the air valve is opened, allowing the tightening sequence to begin after the switch is opened. Leaving the switch in the closed position allows the tool to operate normally where no control of the fastener torque is required. It is assumed that a lug nut has been threaded down upon the stud so that it is just in contact with the wheel rim prior to applying tool 100, and that the joint rate of the fastener is uniform. It is recognized that many impact tool operators use a tightening procedure in which the tool is used to tighten the nut upon the stud from an initially loose condition. As a result there are two distinct joint rates during the tightening procedure, before and after the nut contacts the rim. Because of this, the calculated torque of the preferred embodiment will possess an error during the first few impulses. However, once the-nut contacts the rim, the calculated torque of the preferred embodiment converges rapidly toward the actual torque value of fastener 16, with minimal additional error.

The preferred embodiment is described with discreet analog components. However, any means can be used to accomplish the disclosed and claimed function. For example, the controller can be a programmable solid state device. The signals, such as the control signal, can be generated in various ways and can be of various forms. The control signal can be used to control an impact tool in any desired manner. Variables can be entered into controller and/or adjusted using any known input devices.

The invention has been described through a preferred embodiment. However, various modifications can be made without departing from the scope of the invention as defined by the appended claims and legal equivalents thereof.

What is claimed:

1. A retrofit system, for an impact tool of the type comprising a body and an output shaft adapted to be coupled to a fastener, said retrofit system comprising:

a shaft extension having a first end and a second end, said first end being adapted to be coupled to the output shaft and said second end being adapted to be coupled to the fastener;

a torque transducer coupled to said shaft extension; and means for processing the output of the torque transducer to obtain torque on the fastener, wherein said means for processing comprises:

means for generating a torque pulse signal based on the output of the torque transducer;

means for subtracting a torque signal from the torque impulse signal to generate a difference signal;

means for integrating the difference signal to obtain a fastener angular velocity signal;

means for integrating the velocity signal to obtain a fastener angular displacement signal; and means for converting the angular displacement signal to the torque signal representing torque on the fastener.

2. A retrofit system as recited in claim 1 wherein said means for generating a torque pulse signal, said means for subtracting a torque signal from the torque pulse signal, said means for integrating the difference signal, said means for integrating the velocity signal, and said means for converting all comprise a programmable microprocessor based controller.

3. A retrofit system as recited in claim 1, wherein said means for generating a torque pulse signal, said means for subtracting a torque signal from the torque pulse signal, said means for integrating the difference signal, said means for integrating the velocity signal, and said means for converting all comprise an analog circuit controller.

4. A retrofit system as recited in claim 1, wherein said means for integrating the difference signal is activated only when the difference signal has a value of greater than zero.

5. A retrofit system as recited in claim 1, further comprising:

means for comparing the value of the torque signal to a preset threshold value; and means for terminating said means for applying when the value of the torque signal equals or exceeds the threshold value.

6. A retrofit system as recited in claim 1, wherein the threshold value is a value of desired torque of the fastener.

7. A retrofit system as recited in claim 1, wherein said means for generating comprises:

means for producing a magnetic field based on the torque in said shaft extension;

means for inducing a voltage in a detector with the magnetic field; and means for integrating the voltage.

8. A retrofit system as recited in claim 7, wherein said means for producing comprises a magnetoelastic transducer coupled to said shaft extension.

9. A retrofit system as recited in claim 1 wherein, said means for subtracting a torque signal from the torque pulse signal comprises a differential amplifier, said means for integrating the difference signal comprises an op-amp integrator, and said means for integrating the velocity signal comprises an op-amp integrator.

10. A retrofit system as recited in claim 7, wherein said detector comprises a coil of wire circumferentially arrayed around said torque transducer.

11. A retrofit system as recited in claim 1, further comprising an autobias circuit for correcting offsets in the means for generating the torque pulse signal.

12. A retrofit system as recited in claim 11, wherein the autobias circuit comprises:

means for sampling an output of the means for generating the torque pulse signal;

means for integrating a sample produced by said means for sampling; and means for subtracting an output of said means for integrating from an input to said means for generating the torque pulse signal.

13. A retrofit system as recited in claim 11, further comprising means for muting said autobias circuit during impulses.

14. A retrofit system as recited in claim 13, wherein said means for muting comprise an analog switch.

* * * * *